United States Patent
Wang et al.

(10) Patent No.: US 6,288,005 B1
(45) Date of Patent: *Sep. 11, 2001

(54) SUPPORTED CATALYST COMPONENT FOR ETHYLENE POLYMERIZATION AND COPOLYMERIZATION

(75) Inventors: Bor-Ping E. Wang, Peekskill; Elliot I. Band, North Tarrytown, both of NY (US); Ronald A. Epstein, Upper Montclair, NJ (US)

(73) Assignee: Akzo N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 08/314,568

(22) Filed: Sep. 28, 1994

Related U.S. Application Data

(63) Continuation of application No. 08/025,709, filed on Mar. 3, 1993, now abandoned.

(51) Int. Cl.⁷ .................................................. B01J 31/00
(52) U.S. Cl. ........................ 502/116; 502/115; 502/119; 502/120; 502/125
(58) Field of Search .................... 502/115, 116, 502/119, 120, 125

(56) References Cited

U.S. PATENT DOCUMENTS

| | | |
|---|---|---|
| 4,378,304 | 3/1983 | Dombro . |
| 4,396,533 | 8/1983 | Johnstone . |
| 4,458,058 | 7/1984 | Dombro . |
| 4,481,301 | 11/1984 | Nowlin et al. . |
| 5,063,188 | 11/1991 | Malpass et al. . |
| 5,244,853 * | 9/1993 | Wang et al. ................. 502/115 |
| 5,258,345 | 11/1993 | Kiisin et al. ................. 502/116 |
| 5,336,652 | 8/1994 | Mink et al. ................. 502/125 |
| 5,344,803 | 9/1994 | Menon et al. ................. 502/116 |

FOREIGN PATENT DOCUMENTS

| | | | |
|---|---|---|---|
| 193281 | 9/1986 | (EP) | ............... C08F/4/64 |
| 208524 | 1/1987 | (EP) | ............... C08F/4/64 |
| 240254 | 10/1987 | (EP) | ............... C08F/4/60 |
| 261808 | 3/1988 | (EP) . | |

* cited by examiner

*Primary Examiner*—Elizabeth D. Wood
(74) *Attorney, Agent, or Firm*—Richard P. Fennelly

(57) ABSTRACT

A catalyst component, adapted for use in the polymerization and copolymerization of ethylene, is formed by reaction of an organomagnesium compound with a metal oxide support to form a supported organomagnesium composition, reaction of the supported organomagnesium composition and a tetraalkyl silicate, contact of the resulting product with a chlorinating reagent, and treatment of the product from the previous step with liquid titanium halide.

20 Claims, No Drawings

US 6,288,005 B1

SUPPORTED CATALYST COMPONENT FOR ETHYLENE POLYMERIZATION AND COPOLYMERIZATION

This is a continuation of application Ser. No. 08/025,709 filed Mar. 3, 1993 now abandoned.

BACKGROUND OF THE INVENTION

1. Field of the Invention

The present invention relates to a catalyst component for ethylene polymerization and copolymerization with other olefins.

2. Description of the Prior Art

The scientific literature (publication and patent literature) contains numerous examples of catalyst components for the homo- and copolymerization of ethylene. The following are exemplary as describing unsupported catalyst components:

1. European Patent Publication No. 140,536 describes a titanium halide-containing catalyst prepared by (1) reacting a magnesium hydrocarboyloxide with a silicon compound having at least one hydrogen-silicon bond; (2) contacting the resulting product with an electron donor; and (3) contacting the resulting product with a titanium halide;

2. PCT International Publication No. WO 88/05056 describes a catalyst component obtained by (1) treating an organomagnesium compound without chlorine with a solid silane compound containing one or two hydroxyl groups and (2) then with a titanium halide compound; and 3. European Patent Publication No. 261,808 describes formation of a catalyst component, useful in the polymerization of ethylene-propylene copolymer rubber, which is formed by contacting a metal oxide with a magnesium compound, such as a dialkylmagnesium, and subsequently contacting the resulting product with a titanium compound, such as titanium tetrachloride, or, optionally, first with an alcohol or a silicon compound. 4. U.S. Pat. No. 5,063,188 to D. B. Malpass describes a catalyst component formed by reaction of an organomagnesium compound and a tetraalkyl silicate, contact of the resulting product with a chlorinating reagent, and treatment of the product from that previous step with liquid titanium halide.

Examples of the synthesis of supported catalyst components are provided in the following:

1. U.S. Pat. Nos. 4,378,304 and 4,458,058 to R. A. Dombro describe reaction of a support with a Group IIA organometallic compound free of aluminum alkyls, reaction of the resulting product with water or a hydrocarbyl alcohol, then reaction of that product with, for example, titanium tetrachloride.

2. U.S. Pat. No. 4,396,533 to A. Johnstone heats a refractory oxide support having surface hydroxyl with, for example, an organic derivative of a metal, such as tetraethyl silicate, followed by reaction of the resulting product with one or more organometallic compounds, followed by impregnation of the resulting solid product with a halogen-containing transition metal compound, such as titanium tetrachloride.

3. U.S. Pat. No. 4,481,301 to T. E. Nowlin et al. treats a support with an organomagnesium composition and then suspends the supported magnesium composition thus formed in a liquid medium with a tetravalent titanium compound.

4. European Patent Publication No. 261,808 contacts a metal oxide with an organomagnesium compound, then contacts the resulting composition, optionally, first with an alcohol or silicon compound (which can either contain hydrocarbyloxy groups or halogen atoms) and then with a titanium compound and an organoaluminum compound.

High density ethylene homopolymers are widely used in injection molding operations. Advantageously such resins, when used in injection molding operations, should have a narrow molecular weight distribution (MWD) which is largely determined by the nature of the catalyst. The catalyst should also exhibit other desirable characteristics for commercial use. The catalyst productivity should be as high as possible so that the resin will have low catalyst residue. It is also very desirable that the catalyst result in a polymer having a large particle size and high bulk density. Another desirable characteristic of the catalyst is that it have a high hydrogen response. A high hydrogen response means that small increases in the amount of hydrogen used in the reactor will result in substantial decrease in molecular weight and a higher melt index polymer.

SUMMARY OF THE INVENTION

The catalyst component of the instant invention is formed by: (1) initially reacting a metal oxide support with an organomagnesium compound to form a supported organomagnesium composition; (2) reacting an organomagnesium compound with a tetraalkyl silicate; (3) contacting the resulting product with a chlorinated reagent; and (4) contacting the resulting product with a liquid titanium compound containing halogen.

In accordance with this invention a silica supported catalyst is treated with an organomagnesium compound, then with alkoxysilane and halogenate reagent, and finally with titanium tetrachloride. The catalyst is particularly suitable for preparing HDPE with narrow MWD and large particle size, good productivity and hydrogen response.

DETAILED DESCRIPTION OF THE INVENTION

The first step in the process for forming the catalyst component of the present invention involves the reaction of an appropriate metal oxide support material (e.g., silica, alumina, zirconia, titania, and the like) with an organomagnesium compound to form a supported organomagnesium compound. This support is porous and particulate in nature and is substantially inert to many of the other components of the catalyst composition desired, with the exception of the organomagnesium compound, as well as the active components of the reaction system used to form the catalyst component described herein. It is preferably in the form of a dry powder having an average particle size of from about 1 micron to about 250 microns, preferably from about 15 microns to about 100 microns. The specific surface area of the support is preferably at least about 3 $m^2$/gm, and preferably at least about 50 $m^2$/gm. The support should be dry, that is, free of absorbed water. Drying of the support material can be affected by heating at about 100° C. to about 800° C., preferably from about 150° C. to about 600° C. The silica of the most preferred embodiment is a high surface area, amorphous silica (surface area =300 $m^2$/gm; pore volume of 1.65 $cm^3$/gm). A material of this type is marketed under the trade names Davison 952 or Davison 955 by the Davison Chemical Division of W. R. Grace. The contacting of organomagnesium compound and support causes reaction of certain organo (e.g., alkyl) groups with hydroxy functionality in the support. The contacting preferably takes place in a suitable hydrocarbon solvent (e.g., heptane) at reflux, for example. The organomagnesium compound is preferably dialkylmagnesium where the alkyl groups are $C_1$ to $C_8$ such as butylethylmagnesium, dibutylmagnesium, diisobutylmagnesium and dihexylmagnesium.

It has been found that treatment of the support with a chlorinating reagent, such as silicon tetrahalide, prior to treatment with the organomagnesium compound, enables the production of a final catalyst in accordance with this invention which produces a polymer product having a higher bulk density.

The next step involves the reaction of the supported organomagnesium compound with an alkoxy silane which serves to replace remaining organo (e.g., alkyl) groups on the supported organomagnesium compound with alkoxy groups. This reaction is also preferably conducted in a suitable hydrocarbon solvent (e.g., heptane) at reflux, for example, using substantially equimolar amounts of magnesium and silicon compounds. The alkoxy silane is of the formula $R_nSi(OR')_{4-n}$ with n ranging, for example, from 0 to 3, where R and R' are also alkyl (e.g., $C_1$ to $C_6$ alkyl). Representative compounds include tetraethyl silicate, tetramethyl silicate, tetrabutyl silicate, and dimethoxydiphenylsilane.

The foregoing reaction yields a supported product which comprises an admixture of magnesium alkoxide and silicon compounds which contain a typical magnesium content of about 2% to about 4%, by weight. This material is then contacted with a suitable chlorinating agent to yield a composition comprising a mixture of magnesium compound of the general formula $Mg(OR)_{2-n}Cl_n$, where R is as defined above and n can range from 0 to 2. Examples of suitable chlorinating agents include carbon tetrachloride, silicon tetrachloride and methyl trichlorosilane. The contacting conditions can be in a molar ratio of magnesium compound to chlorinating reagent of from about 1:1 to about 1:5.

The resulting product is an activated supported solid carrier and is then contacted with a liquid titanium halide, preferably at elevated temperature. The preferred titanium halide is titanium tetrahalide. After the addition of the titanium halide compound is completed, the non-polar solvent is slowly removed, e.g., by evaporation or filtration.

The catalyst component formed by the previously described steps can be combined with the organoaluminum cocatalyst components (e.g., trialkylaluminum) conventionally used in olefin polymerization reactions in conventional amounts (e.g., from about 200:1 moles of cocatalyst to titanium-containing component to about 5:1). A particularly preferred aluminum to titanium ratio is in the general range of from about 30:1 to 150:1.

The instant catalyst component is useful in the polymerization of ethylene and the copolymerization of ethylene with higher 1-olefins (e.g., those having four or more carbon atoms, such as butene-1, 4-methylpentene-1, hexene-1 and octene-1). The catalyst of the instant invention has excellent activity, exhibits very good hydrogen response and produces polymer with a large particle size (medium particle size of over 500 microns).

The instant invention is further illustrated by the Examples which follow.

EXAMPLE 1

This Example illustrates preparation of one embodiment of the catalyst of the present invention.

First, 14.4 gms of Davison 952 grade silica (previously heated for about four hours under dry nitrogen purged at 150° C.) was slurried under nitrogen into 150 ml of dry heptane contained in a 500 ml three neck, bottom frit flask fitted with an overhead stirrer, reflux condenser and a gas inlet/outlet adaptor. Then, 10 wt % of butylethylmagnesium in heptane was added dropwise (15.4 gm, 14.6 m mole Mg) at room temperature. The resulting slurry was heated to reflux for one hour and was stirred during refluxing. The supernatant was removed by using positive nitrogen pressure to push the solvent through the bottom fine frit filter. The remaining solid was washed with heptane (200 ml×2), and 150 ml of dry heptane was charged as diluent followed by 3.92 gm of tetraethyl orthosilicate (18.8 m mole Si). The slurry was heated to reflux temperature (98° C.), and the reaction mixture was then stirred at refluxing temperature for one hour. The supernatant was removed by using positive nitrogen pressure to push it through the fine frit filter. The remaining solid was washed with dry heptane (200 ml×2). Then 150 ml of dry heptane was charged as diluent followed by 6.05 gm of silicon tetrachloride (35.6 m mole of Si). After the addition was completed, the reaction mixture was heated to reflux temperature (980°) and was stirred for one hour. The supernatant was removed by using positive nitrogen pressure to push it through the fine frit filter. The remaining solid was washed with dry heptane (200 ml×2). The solid was reslurried with 200 ml of dry heptane and 7 ml of titanium tetrachloride was added. The slurry was heated to reflux temperature (98° C.), and the reaction mixture was then stirred at refluxing temperature for one hour. The supernatant was removed by using positive nitrogen pressure to push it through the fine frit filter. The remaining solid was washed with hot toluene (200 ml×5) and hexane (200 ml×2). Solvents were removed by vacuum to give 18.1 gm of free-flowing powder. The resulting catalyst component contained 2.5% titanium, 1.8% magnesium, and 12.3% chlorine, on a weight basis.

EXAMPLES 2–6

These Examples illustrate the general procedure for the slurry polymerization of ethylene employing the catalyst of this invention.

A stainless-steel 4 liter ZipperClave reactor equipped with a mechanical stirrer and temperature controller was purged with nitrogen and pickled with triisobutyl-aluminum/hexane solution. After a rinse with dry hexane, the reactor was then charged with 2 liters of n-hexane which had been amply dehydrated and deoxygenated. A charging assembly was used to add the triisobutylaluminum cocatalyst and catalyst. A total amount of 2.0 to 3.0 mmol aluminum and $2.0–3.0 \times 10^{-5}$ mole Ti were introduced at 50° C. A specific amount of hydrogen was charged to the vessel as a polymerization moderator at 50° C. After the reactor temperature reached 80° C., 120 psig ethylene was introduced to the reactor. The standard polymerization temperature was 85° C. After sixty minutes, polymerization was terminated by blocking the flow of ethylene with subsequent venting and cooling of the vessel. Polyethylene was isolated as a white powder. The melt index (MI) and high load melt index (HLMI) were measured using ASTM-1238 Conditions E and F. The melt index ratio was obtained by dividing HLMI by MI and is considered a measure of the molecular weight distribution (MWD). A low MIR indicates narrow MWD.

The following Table illustrates the results obtained.

TABLE 1

| Ex. No. | Productivity (g PE/g Cat.) | Initial $H_2$ (psig) | LLMI/HLMI (g/10 min.) | MIR | PBD* (g/ml) |
|---|---|---|---|---|---|
| 2 | 2696 | 59 | 0.56/17.93 | 32.0 | 0.309 |
| 3 | 2730 | 63 | 0.86/28.68 | 33.4 | 0.299 |
| 4 | 2711 | 63 | 0.82/27.06 | 33.0 | 0.315 |
| 5 | 2431 | 67 | 1.46/47.80 | 32.7 | 0.299 |
| 6 | 2614 | 73 | 2.88/86.98 | 30.2 | 0.306 |

*PBD = Pour bulk density (ASTM-1895-69).
Ti content = 2.5 wt %.

EXAMPLE 7

This Example illustrates preparation of the catalyst in accordance with the present invention where silicon tetrachloride was used to initially pretreat the silica support.

Silica (18.0 gm of Davison 952 grade), previously heated for about four hours under a dry nitrogen purged at 150° C., was slurried under nitrogen into 150 ml of dry heptane contained in a 500 ml three-neck bottom frit flask fitted with an overhead stirrer, reflux condenser and a gas inlet-outlet adaptor. Silicon tetrachloride was then added dropwise (6.70 gm, 39.4 mmole) at room temperature. The resulting slurry was heated to reflux and was stirred at reflux for one hour. The supernatant was removed by using positive nitrogen pressure to push it through the fine frit filter. The remaining solid was washed with heptane (150 ml×2).

Then, 150 ml of dry heptane was charged as a diluent to the treated silica material, followed by 33.4 gm of a 10% by weight butylethylmagnesium (31.6 mmole mg) solution. The slurry was heated to reflux temperature (98° C.), and the reaction mixture was then stirred at refluxing temperature for one hour. The supernatant was removed by using positive nitrogen pressure to push it through the fine frit filter. The remaining solid was washed with dry heptane (150 ml×2).

Then, 150 ml of dry heptane was charged as a diluent followed by 7 ml of tetraethylorthosilicate. The slurry was heated to reflux temperature (98° C.), and the reaction mixture was then stirred at refluxing temperature for one hour. The supernatant was removed by using positive nitrogen pressure to push it through the fine frit filter. The remaining solid was washed with dry heptane (150 ml×2).

Then, 150 ml of dry heptane was charged as a diluent followed by 6.95 gm of silicon tetrachloride. After the addition was completed, the reaction mixture was heated to reflux temperature (980° C.) and stirred for one hour. The supernatant was removed by using positive nitrogen pressure to push it through the fine frit filter. The remaining solid was washed with dry heptane (150 ml×2).

The solid was reslurried with 150 ml of dry heptane and 1.5 ml of titanium tetrachloride was added. The slurry was heated to reflux temperature (98° C.), and the reaction mixture was then stirred at refluxing temperature for one hour. The supernatant was removed by using positive nitrogen pressure to push it through the fine frit filter. The remaining solid was washed with hot toluene (150 ml×3) and hexane (150 ml×3). Solvents were removed by vacuum to give 22.2 gm of free-flowing powder. The component contained 2.0% titanium, 2.9% magnesium, and 12.2% chlorine on a weight basis.

The silica supported catalyst previously described was then tested as described in Table 2 given below:

TABLE 2

| Ex. No. | Productivity (g PE/g Cat.) | Initial H$_2$ (psig) | LLMI/HLMI (g/10 min.) | MIR | PBD* (g/ml) |
| --- | --- | --- | --- | --- | --- |
| 8 | 2872 | 55 | 1.04/31.60 | 30.4 | 0.358 |
| 9 | 2505 | 59 | 1.11/33.40 | 30.1 | 0.339 |
| 10 | 2128 | 63 | 1.42/45.90 | 32.3 | 0.299 |
| 11 | 3413 | 73 | 2.23/71.05 | 31.9 | 0.352 |
| 12 | 2330 | 73 | 2.26/70.90 | 31.4 | 0.327 |

Test conditions: 2 L hexane, catalyst and TIBAL at 50° C., Al/Ti=100, H$_2$ at 50° C., 120 psig ethylene, 85° C., 60 minutes polymerization.
Ti=2.0 wt %.

The bulk density (PBD) for these runs (Examples 8–12) was generally higher than for the previous rums of Examples 2–6.

We claim:

1. A catalyst component for ethylene polymerization formed by:

(1) initially reacting a metal oxide support with an organomagnesium compound to form a supported organomagnesium composition;

(2) reacting the supported organomagnesium composition with an alkoxy silane that is of the formula $R_nSi(OR')_{4-n}$, where n ranges from 0 to 3 and R and R' are alkyl;

(3) contacting the product from step (2) with a chlorinating reagent; and (4) contacting the product from step (3) with a liquid titanium halide.

2. A catalyst component as claimed in claim 1 wherein the organomagnesium compound is a dialkylmagnesium compound.

3. A catalyst component as claimed in claim 1 wherein the organomagnesium compound is a $C_1$–$C_8$ dialkylmagnesium compound and the alkoxy silane is a $C_1$–$C_6$ tetraalkyl silicate.

4. A catalyst component as claimed in claim 1 wherein the organomagnesium compound is butylethylmagnesium.

5. A catalyst component as claimed in claim 1 wherein the chlorinating reagent is silicon tetrachloride.

6. A catalyst component as claimed in claim 1 wherein the support is pretreated with a chlorinating reagent prior to treatment with the organomagnesium compound.

7. A catalyst component as claimed in claim 1 wherein the liquid titanium halide is titanium tetrahalide.

8. A catalyst component as claimed in claim 1 wherein the organomagnesium compound is a dialkylmagnesium compound and the liquid titanium halide is titanium tetrahalide.

9. A catalyst component as claimed in claim 1 wherein the alkoxy silane is of the formula $R_nSi(OR')_{4-n}$, where n ranges from 0 to 3 and R and R' are alkyl, and the chlorinating reagent is silicon tetrachloride.

10. A catalyst component as claimed in claim 9 wherein the support is pretreated with a chlorinating reagent prior to treatment with the organomagnesium compound.

11. A catalyst component as claimed in claim 1 wherein the metal oxide is silica.

12. A catalyst component as claimed in claim 2 wherein the metal oxide is silica.

13. A catalyst component as claimed in claim 3 wherein the metal oxide is silica.

14. A catalyst component as claimed in claim 4 wherein the metal oxide is silica.

15. A catalyst component as claimed in claim 5 wherein the metal oxide is silica.

16. A catalyst component as claimed in claim 6 wherein the metal oxide is silica.

17. A catalyst component as claimed in claim 7 wherein the metal oxide is silica.

18. A catalyst component as claimed in claim 8 wherein the metal oxide is silica.

19. A catalyst component as claimed in claim 9 wherein the metal oxide is silica.

20. A catalyst component as claimed in claim 10 wherein the metal oxide is silica.

\* \* \* \* \*